United States Patent [19]

Ryan

[11] Patent Number: 5,476,543
[45] Date of Patent: Dec. 19, 1995

[54] ENVIRONMENTALLY SAFE WELL PLUGGING COMPOSITION

[76] Inventor: Robert G. Ryan, 239 Joyce Dr., El Dorado, Ark. 71730

[21] Appl. No.: 278,372

[22] Filed: Jul. 19, 1994

[51] Int. Cl.⁶ .................................................. C04B 14/10
[52] U.S. Cl. ........................ 106/487; 106/218; 106/241; 106/416; 166/293; 166/295; 428/403; 428/497; 530/201; 507/112
[58] Field of Search ........................................ 106/218, 241, 106/416, 487; 252/8.551; 166/293, 294, 295; 428/403, 497; 530/201

[56] References Cited

U.S. PATENT DOCUMENTS

| | | | |
|---|---|---|---|
| 2,836,555 | 5/1958 | Armentrout | 252/8.551 |
| 4,124,550 | 11/1978 | Kobayashi et al. | 106/241 |
| 4,194,915 | 3/1980 | Perkins | 106/241 |
| 4,391,925 | 7/1983 | Mintz et al. | 166/293 |
| 4,810,534 | 3/1989 | Seaborne et al. | 106/218 |
| 4,929,580 | 5/1990 | Jones | 106/487 |
| 5,106,421 | 4/1992 | Marshall, Jr. et al. | 106/487 |
| 5,322,879 | 6/1994 | Gane et al. | 106/487 |

*Primary Examiner*—Mark L. Bell
*Assistant Examiner*—Michael Marcheschi
*Attorney, Agent, or Firm*—Joseph A. Strode

[57] ABSTRACT

A composition for plugging wells that is biodegradable and environmentally safe comprising bentonite particles coated with a water soluble coating of biodegradable natural resin, such as certified three pound Confectioners White Lac Glaze in Specially Denatured Ethyl Alcohol (SDA) Formula 35A, 190 proof. The bentonite may be in the form of chips or compressed pellets. When exposed to water, the soluble coating dissolves at a uniform rate, exposing the bentonite to water whereupon it expands to form a tough but flexible water impermeable seal of a semi-solid, gel-like mass.

5 Claims, 2 Drawing Sheets

ENVIRONMENTALLY SAFE WELL PLUGGING COMPOSITION

BACKGROUND OF THE INVENTION

Because of their propensities to expand when contacted with water, various water swellable clays such as bentonite have been used in well plugging compositions for many years. However, they are typically introduced in solution, emulsion or other liquid/solid mixture with various chemicals, the selection of which is determined by the particular combination of substances used, the depth of the desired plugging location, the specific plugging objective, etc. For example Engle U.S. Pat. No. 3,407,878 discloses a method of sealing zones or formations of lost circulation of drilling fluids by separately introducing water/clay suspension, and an aqueous solution of a polyalkylene glycol polymer, which interact to flocculate and coagulate. In situations where it is desired to delay the coagulation process, he discloses the introduction of a barrier fluid after introduction of the water/clay suspension. Mintz U.S. Pat. No. 4,391,925 also discloses a similar approach to sealing zones in wells by introducing oil encapsulated bentonite and water, and then applying a shearing force to rupture the oil phase envelope to enable water to contact the bentonite to produce expansion and sealing. Drake U.S. Pat. No. 4,475,594 discloses a very similar process involving water-in-oil emulsion having bentonite dispersed in the oily phase which includes use of an oil soluble amine and a polyamine derivative surfactant. Armentrout U.S. Pat. No. 3,028,913 discloses a sealing composition consisting of a ready-mix composition which is mixed with water and then pumped into the well to the desired plugging location, along with a delayed action accelerator (sodium phosphates or various chlorides). More recently, Mason U.S. Pat. Nos. 4,463,808 and 4,566,708 disclose injecting a mixture of water, water swellable clay and a polymer (such as polyacrylamide), which inhibits swelling of the clay for a period of time, hopefully until the mixture reaches the desired location. All of these well plugging compositions are injected into the well in liquid form and require multiple components which must be transported and mixed and require the use of pumps or other equipment to introduce them into the well. They each include various chemical components which would be undesirable in drinking water wells or environmental monitoring wells. All of them recognize the need to prevent premature swelling and setting up of the clay and use various approaches to solve the problem. They require expensive grouting equipment and are labor intensive, in relation to applicant's invention.

In contrast, applicant has developed a composition consisting of compressed bentonite pellets or bentonite chips which are coated with a food grade white shellac which is water soluble. This composition may be introduced by pouring directly from a bag into the bore hole and allowing them to descend by gravity to the desired plugging location. Armentrout U.S. Pat. No. 2,836,555 discloses compressed bentonite pellets coated with a water insoluble material, and having small holes drilled into each pellet which permits the entry of an initial small quantity of water, and as more water is slowly absorbed eventually the pellets swell sufficiently to burst the coating and expose more of the bentonite to the water and the coagulation process is thus completed. Compared to applicant's invention, however, the pellets of Armentrout require an additional and expensive process step of drilling a hole into each pellet, and the chemical substances he discloses for coatings would be undesirable in water wells and monitoring wells.

As a demonstration of the difficulty presented to applicant in developing this invention, it may be noted that after testing many potential compositions which turned out to be unacceptable for a variety of reasons, applicant first settled on a composition of bentonite coated with natural resin in solution consisting of three pound pure white shellac in SDA1-2, 190° ethyl alcohol. Although this composition was found to be effective in sealing wells, it gives off a strong alcohol odor which was offensive to product handlers, and it was discovered that it introduced undesirable residues of methyl isobutyl ketone (commonly referred to as MIBK) which were unacceptable in drinking water wells and monitoring wells. Only after continuing the development process for additional months was applicant able to come up with a product which is both functional and environmentally safe.

Although bentonite pellets have been used for years to plug wells, uncoated pellets have presented many problems, particularly when the location of the desired seal was below the water level and/or in narrow spaces between the wall of the bore hole and the well casing. Uncoated pellets begin to expand immediately upon becoming moist and the surface becomes sticky. When the pellets are dropped into a well and become moist before reaching the desired seal location, they begin to stick to the sides of the well casing and/or the bore hole, and may form bridges or clumps that prevent a sufficient number of pellets from reaching the desired seal location in the area beneath the bridge or clump, resulting in a nonuniform seal and in some cases an incomplete seal. The coated pellets of applicant's invention do not swell or become sticky until the coating is fully dissolved and thus do not bridge or clump. The coating is biodegradable and environmentally safe, and when dissolved exposes the bentonite which then expands to form a tough but flexible seal that will withstand considerable seismic movement and remain water impermeable. The coating on the pellets has an essentially uniform dissolve rate of 1 mil every three minutes when exposed to water, and thus the coating thickness can be varied depending upon the depth of the plugging location.

SUMMARY OF THE INVENTION

The invention is a composition for plugging wells that is especially useful for plugging water wells, environmental monitoring wells, and other wells where an objective is to prevent contamination from environmentally undesirable substances from surface water or contaminated shallow aquifers. Although the composition can be used in plugging oil and gas wells, it is especially useful in situations where avoidance of environmentally undesirable contaminants is of utmost importance. The composition utilizes products which are fit for human consumption, and is not a hazardous waste or hazardous material under EPA criteria (49 CFR 172, subpart B).

It is an object of the invention to produce a well plugging composition which is non toxic, non polluting and non hazardous and is suitable for use in drinking water wells and environmental monitoring wells.

It is another object of the invention to produce a well plugging composition which will not become sticky or commence expanding upon initial contact with water and thereby prevents binding, clumps and faulty seals.

Another object of this invention is to provide a well plugging composition that can be readily designed for deep or shallow plugging applications by varying the thickness of a water soluble coating on particles of water expandable clay.

Another object of this invention is to produce a well plugging composition that can be mass produced by a simple and economical process.

DETAILED DESCRIPTION

Figure 1:
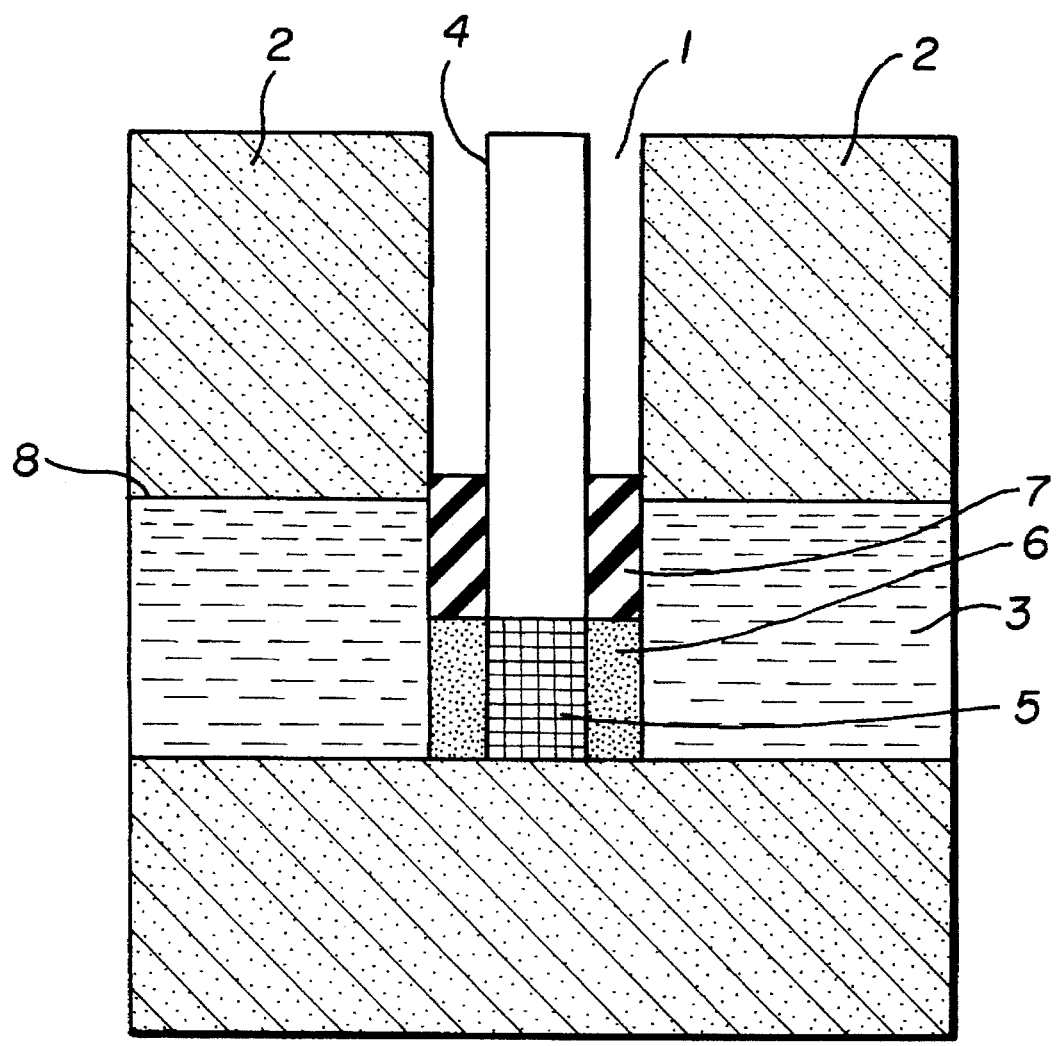
FIG. 1 is a section view illustrating use of the invention for plugging a well.

The preferred expandable clay for use in applicant's invention is Western Bentonite, as it is readily available, economical, and expands with predictable consistency after exposure to water. It is commonly employed as a general purpose food additive and in applications such as water clarification, body powder and cosmetics. It is therefore safe for human consumption and skin contact. It is also non-toxic to aquatic species.

Bentonite is used in both unprocessed form as bentonite chips, and in processed form as compressed bentonite pellets. When exposed to water, the bentonite chips will expand to a volume from four to six times the volume occupied by the dry chips, and the compressed pellets will expand from eight to twelve times the size of the dry pellets. Although the compressed pellets will expand more and will form a tighter and longer lasting seal in a confined area, the processing step of compressing the bentonite adds to the cost. The chips are a more economical alternative for temporary seals or in applications where the additional compression forces generated by the expanding compressed pellets would be undesirable.

In one embodiment the invention comprises uncompressed particles or chips of bentonite that are coated with a water soluble coating consisting of food grade shellac. The preferred shellac is certified three pounds Confectioners White Lac Glaze in Specially Denatured Ethyl Alcohol (SDA) Formula 35A, 190 proof, manufactured by Bradshaw Praeger & Company.

The bentonite chips are placed in a cone shaped tumbler and the shellac is added as the bentonite chips are being rotated in the tumbler, with 28 liquid ounces of shellac being used for each 100 pounds of bentonite. The bentonite chips are then allowed to dry for approximately 10 minutes until tacky, then 1.5 pounds of talcum powder is added, and the tumbling process is continued for approximately five minutes after addition of the talc. Another 28 liquid ounces of shellac is then added, and after another drying period of approximately 10 minutes, is followed by another 1.5 pounds of talc, and tumbling is continued for approximately another five minutes. The plugging composition which is made in this manner will have a water soluble coating approximately 10 mils thick, which will dissolve approximately 30 minutes after contact with water, which enables water to contact the bentonite, causing it to expand and compress into a water impermeable seal.

For application in deeper wells, additional coatings of the water soluble coating are applied. For example, if the desired time is 60 minutes before expansion of the bentonite is to begin, then after a drying process of 24 hours, the process described in the preceding paragraph is repeated, resulting in a uniform double layer of water soluble coating approximately 20 mils thick, that will dissolve completely in approximately one hour after exposure to water.

In another preferred embodiment, compressed bentonite pellets are used in the place of uncompressed bentonite chips, and the coating process is performed in the same manner, with ingredients added in the same relative proportion. After one coating process, the result is bentonite pellets coated with a uniform water soluble coating which will dissolve in about 30 minutes, whereupon the pellets expand up to 12 times their original size, losing their pelletized form, and filling in all voids and crevices and forming a semi-solid gel-like seal that is water impermeable.

There are many situations in well drilling where use of an environmentally safe composition which will create a water impermeable seal is desired. In water wells and monitoring wells, it is desirable to seal the area around the well to prevent possible contamination from surface runoff or seepage. When a well is abandoned, there is a requirement of law that it be plugged with an effective seal. This composition is also useful for hollow stem auger drilling, in which drilling residue is removed through the hollow drill stem during the drilling process, a well casing is then inserted inside the auger, sand is added around the casing, the coated pellets are dropped into the well on top of the sand, and the auger is then removed before the soluble coating has dissolved. If uncoated bentonite is used, the pellets begin swelling and become sticky upon initial contact with water and may stick to the sides of the casing of the auger, resulting in a failed seal. The contractor must then pull the casing and repeat the drilling and sealing process.

FIG. 1 is an illustrative application of applicant's invention. A bore hole 1 has been drilled through dry earth 2 into a water bearing strata 3. A well casing 4 has been inserted into the bore hole 1 and is fitted with a well screen 5 on the lower portion of the casing. After the well casing and well screen are in place, filter sand 6 is dropped into the bore hole to a level even with the top of the well screen. Applicant's plugging composition is then dropped into the bore hole on top of the filter sand to form a plug 7. Since the location of the plug is below the water table 8, contact with water causes the coating to dissolve, exposing the bentonite pellets or chips, which then begin to absorb water and expand and compress into a water impermeable seal. Since the top of the seal is above the level of the water table 8, the seal prevents contamination from surface runoff.

Figure 2:
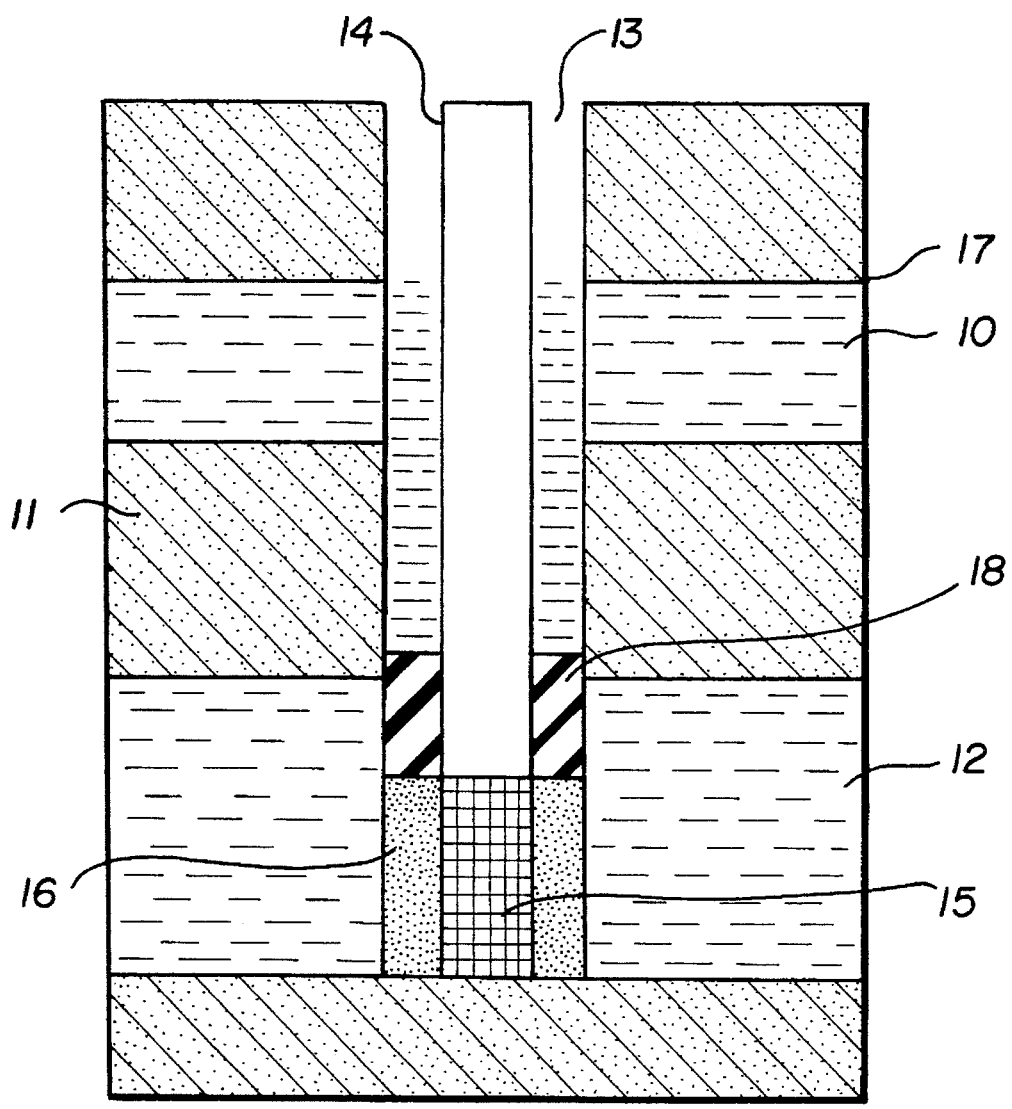
FIG. 2 is a section view illustrating use of the invention for sealing a well shaft between upper and lower water bearing strata.

Another common application of the invention is illustrated in FIG. 2. A first water bearing strata 10 is unsafe for drinking water because it has become contaminated with unacceptable levels of toxic chemicals, fecal matter, or other contaminants. However, a second water bearing strata 12 is located beneath the strata 10 and separated by a water impermeable strata 11 of rock or clay. Because it has been protected by the impermeable strata 11, strata 12 remains sufficiently pure to pass requisite health standards for safe drinking water. A bore hole 13 has been drilled deeply enough to penetrate strata 12, and a well casing 14 has been inserted in the bore hole, and a well screen 15 has been inserted. Filter sand 16 has been dropped into the bore hole around the well casing in sufficient quantity to cover the top portion of well screen 15. The area between the well casing 14 and walls of bore hole 13 will be filled with water all the way to the top of water level 17, which is the upper level of water in unsafe water bearing strata 10. The plugging composition has been dropped into the bore hole and descends to the top of filter sand 16, and has formed a water impermeable seal 18 which prevents water from unsafe strata 10 from entering safe water strata 12. The thickness of the water soluble coating must be sufficient so that it is not totally dissolved until the plugging composition has descended through water from water level 17 to the top of filter sand 16.

The well of FIG. 2 may be either a drinking water well, or an environmental monitoring well which has been drilled for the purpose of monitoring the water of strata 12 to ensure that it continues to remain safe from contamination from the unsafe water in strata 10. In either case, the water impermeable seal 12 formed by use of applicant's plugging composition effectively seals the area between the well casing and bore hole to ensure that there is no communication by this route between unsafe water strata 10 and safe water strata 12.

When wells such as those shown in FIG. 1 and FIG. 2 are eventually abandoned, effective sealing of the well bore hole is required by law. Applicant's plugging composition can be dropped into the well, both inside and outside the well casing, to a level even with the surface, completely filling and plugging the bore hole.

The drop rate of applicant's composition when free falling through water by force of gravity is approximately twenty feet per minute. When the water soluble coating is applied in sufficient thickness to require 30 minutes to dissolve, the composition may be used to make plugs as deep as six hundred feet beneath water level. The coating thickness can be increased for deeper well plugging applications.

TABLE 1

| HOLE DIAM. | 2" | 3" | 4" | 5" | 6" | 7" | 8" |
|---|---|---|---|---|---|---|---|
| LBS. OF PELLETS PER FOOT | 1.75 | 4 | 7 | 11 | 16 | 22 | 28 |

Table 1 illustrates the amount of plugging composition which is required for each foot of seal. By way of example, when a 4" bore hole is to be plugged for a distance of ten feet, 70 pounds of plugging composition is required.

I claim:

1. A well plugging composition comprising particles of water swellable clay coated with a water soluble coating which is non-toxic and biodegradable and which dissolves at a uniform rate upon exposure to water, allowing the clay to expand and form a water impermeable seal of a semi-sold mass.

2. The well plugging composition of claim 1 wherein the water swellable clay is Western Bentonite.

3. The well plugging composition of claim 1 wherein the water soluble coating is comprised of talcum powder and food grade shellac.

4. A well plugging composition comprising particles of Western Bentonite coated with a water soluble coating of talcum powder and Food grade Shellac, wherein the western bentonite is coated with said water soluble coating by the method comprising rotating the Bentonite in a cone shaped tumbler while the Shellac is added in a ratio of 28 liquid ounces of Shellac to 100 pounds of bentonite, allowing the Shellac coated bentonite to dry for approximately 10 minutes until tacky, adding talcum powder in the ratio of 1.5 pounds of talcum powder to 100 pounds of bentonite and tumbling for approximately 5 minutes, adding another 28 liquid ounces of Shellac as the bentonite is tumbled, allowing the bentonite to dry for another period of approximately 10 minutes, adding talcum powder in the ratio of 1.5 pounds to 100 pounds of bentonite and tumbling for approximately 5 more minutes.

5. The well plugging composition of claim 4 wherein the thickness of the water soluble coating is varied according to the depth of the well plugging application.

\* \* \* \* \*